United States Patent [19]
Lin

[11] Patent Number: 5,375,152
[45] Date of Patent: * Dec. 20, 1994

[54] METHOD FOR PREVENTING CO-60 CONTAMINATION OF COOLING WATER CIRCUITS IN NUCLEAR REACTOR

[75] Inventor: Chien C. Lin, Fremont, Calif.

[73] Assignee: General Electric Company, San Jose, Calif.

[*] Notice: The portion of the term of this patent subsequent to Sep. 14, 2010 has been disclaimed.

[21] Appl. No.: 87,560

[22] Filed: Jul. 6, 1993

Related U.S. Application Data

[63] Continuation-in-part of Ser. No. 785,649, Oct. 31, 1991, Pat. No. 5,245,642.

[51] Int. Cl.$^5$ .............................. G21C 19/00
[52] U.S. Cl. ............................. 376/310; 376/305; 376/306
[58] Field of Search ................ 376/305, 306, 310

[56] References Cited

U.S. PATENT DOCUMENTS

| | | | |
|---|---|---|---|
| 4,476,047 | 10/1984 | Bonnici et al. | 252/626 |
| 4,764,338 | 8/1988 | Uchida et al. | 376/313 |
| 4,894,202 | 1/1990 | Nagase et al. | 376/306 |
| 5,015,436 | 5/1991 | Nagase et al. | 376/306 |
| 5,024,805 | 6/1991 | Murray | 376/305 |
| 5,245,642 | 9/1993 | Lin | 376/310 |

*Primary Examiner*—Donald P. Walsh
*Assistant Examiner*—Frederick H. Voss
*Attorney, Agent, or Firm*—J. E. McGinness

[57] ABSTRACT

A method for preventing or reducing the formation of Co-60 contaminated material on the surfaces of a cooling water circuit of a nuclear reactor. The method is carried out during shutdown of the reactor. First, Co-60 contaminated material formed on the surfaces of the cooling water circuit is chemically removed. Then at least one iron compound is added to the cooling water in an amount sufficient to scavenge cobalt from the cooling water. Thereafter, oxygen is injected into the cooling water to provide a dissolved oxygen concentration sufficient to form an oxide film on the surfaces of the cooling water circuit. The oxide film so formed is substantially free of Co-60 isotope. This treatment reduces the radiation hazard to nuclear reactor personnel.

20 Claims, No Drawings

METHOD FOR PREVENTING CO-60 CONTAMINATION OF COOLING WATER CIRCUITS IN NUCLEAR REACTOR

FIELD OF THE INVENTION This application is a continuation-in-part of Ser. No. 07/785,649 filed Oct. 31, 1991, now U.S. Pat. No. 5,245,642.

This invention relates to the operation and safety of water-cooled nuclear reactors, and in particular to measures for reducing the hazards of possible exposure of operating and maintenance personnel to a source of radiation dispersed throughout the cooling water circulating system of such nuclear reactors.

BACKGROUND OF THE INVENTION

A major hazard in water-cooled nuclear reactors is the accumulation of radioactive substances in the structural portions of the reactor. The buildup of radioactive nuclides occurs on the inner surfaces of components which are in contact with the reactor water. This includes both the primary recirculation circuit and the reactor water cleanup system.

During reactor shutdown, workers are exposed to radiation emanating from stainless steel internal walls and inner surfaces of piping. Radioactive materials retained in oxide films which have accumulated on wall and piping surfaces are a major source of radiation exposure. The radioactivity has been found to be predominantly due to the Co-60 isotope. As a result, a substantial effort has been made to identify the key parameters which affect Co-60 buildup and to determine and implement methods for limiting that buildup.

Cobalt, derived from a number of different alloys commonly employed in components of the reactor's mechanisms or structures, is subject to induced radioactivity, especially the Co-60 isotope. This radioactive Co-60 isotope, or ions or compounds thereof, can be carried in the circulating cooling water flowing through the cooling water circuit, whereby the radioactive substances are spread and deposited throughout the cooling water circuit or primary loop system of the reactor plant. Such radioactive substances are prone to be taken up and incorporated into the normally occurring oxide films which form and progressively accumulate on the inner surfaces of the cooling water circuit.

A number of proposals or potential solutions to this problem of dispersion of radioactive substances throughout the cooling water circuit or system and incorporation of radioactive substances into the inherently produced oxide films forming on the surfaces of cooling water circuit or system have been considered or made. One approach to controlling the potentially hazardous cobalt source of such radiation has been the application of zinc as disclosed in U.S. Pat. No. 4,756,874 to Ruiz et al. and U.S. Pat. No. 4,759,900 to Peterson et al.

SUMMARY OF THE INVENTION

The present invention comprises a method for preventing or reducing the contamination of cooling water circuit surfaces by Co-60 isotope in a water-cooled nuclear reactor. The method encompasses the addition of iron compounds and the creation of attendant physical conditions which scavenge Co-60 isotope from the cooling water and also impede subsequent buildup of the Co-60 isotope on the surface of metal components or structures that form the primary cooling circuit system of a water-cooled nuclear reactor.

In particular, the method for preventing or reducing the formation of material contaminated with Co-60 on the surfaces of a circuit carrying cooling water in a nuclear reactor comprises the step of adding at least one iron compound to the cooling water in an amount sufficient to maintain an iron concentration in the cooling water in a range from 50 to 200 ppb. The iron compound is added while the reactor is shut down. Prior to the addition of the iron compound, the cooling water is treated to attain a pH thereof in the range of about 7.5 to about 8.0 measured at a cooling water temperature of about 25° C. Thereafter the cooling water is heated to a temperature of at least about 230° C. and maintained at that temperature while the iron compound is present in the aforementioned concentration. The result of this treatment is that Co-60 is scavenged from the cooling water in the cooling water circuit.

The method further comprises the step of maintaining a dissolved oxygen concentration in the cooling water in a range from 200 to 400 ppb. The oxygen is added for the purpose of accelerating the formation of oxide film on the cooling water circuit surfaces, which oxide films, because Co-60 has been scavenged from the system, will be substantially free of radioactive Co-60 isotope. Such oxide films act as a barrier to the formation of further oxide films The method of the invention further comprises the step of adding at least one iron compound to the cooling water in an amount sufficient to maintain an iron concentration in the cooling water in a range from 50 to 100 ppb during operation of the reactor after the shutdown.

DETAILED DESCRIPTION OF THE PREFERRED EMBODIMENTS

The method of the invention comprises a chemical process for preventing the formation of cobalt-contaminated oxide films on the surfaces of metal structures providing the cooling water circuits of water-cooled nuclear reactors, such as inner portions of pipes, conduits, vessels, tanks, chambers, etc.

Cobalt derived from metal alloy materials utilized in nuclear reactor plants is known as a major source of radiation and, in turn, is a health hazard to operating and maintenance personnel working about the nuclear reactor structures. Cobalt, particularly the Co-60 isotope, is carried in the cooling water throughout the nuclear reactor coolant circuit or system and becomes entrained and/or embedded in the mass of oxides commonly forming and accreting over the exposed metal surfaces of vessels, conduits, etc. of the cooling water circuit system. Reducing the presence of cobalt by replacing cobalt-containing alloys with alloys free of cobalt to minimize its source is expensive and most often impractical.

Chemical decontamination procedures for removing cobalt-contaminated oxide films from inside surfaces of the cooling water circuit have been proposed whereby the hazardous radiation fields are substantially reduced through oxide film removal by chemical means. However, due to extremely high corrosion rates, the decontaminated surfaces rapidly pick up Co-60 isotope from the circulating cooling water and retain it in the accreting body of oxides forming on exposed metal surfaces. Thus, radiation levels measured one cycle after decontamination are frequently as great as before decontamination.

In accordance with the method of the present invention, a chemical technique is provided which controls and/or minimizes contamination in water-cooled nuclear fission reactor systems prior to any significant initial contamination or following decontamination. By minimizing recontamination, the method of this invention can be a more effective means of reducing radiation exposure of personnel in a boiling water nuclear reactor.

The chemical measures of this invention entail a combination of conditions that reduce the soluble (ionic) Co-60 concentration in reactor cooling water and preoxidize the surfaces of the cooling water circuit with an oxide film which is substantially free of Co-60. The steps of the invention comprise adjusting the pH of the cooling water circulating within the cooling water circuit to a slightly basic condition of about 7.5 to about 8 when measured at a water temperature of about 25° C., and adding a solution of an iron compound, including, but not limited to, freshly prepared insoluble species such as $Fe(OH)_3$, $Fe_2O_3$ and $Fe_3O_4$, or water-soluble compounds such as ferrous oxalate and ferric citrate, in amounts sufficient to maintain a soluble iron concentration in the cooling water in the range of 50 to 200 ppb. Under these conditions, preferably augmented by elevated water temperatures, the soluble (ionic) Co-60 in the reactor cooling water is effectively scavenged. Moreover, while the soluble Co-60 concentration in the cooling water is reduced, the surfaces of the cooling water circuit can be oxidized to form a substantially cobalt-free protective film prior to initial operation or following cobalt purging.

Preferred conditions for the practice of this invention comprise adjusting the cooling water pH to about 7.5 to about 8 with adequate $Fe(OH)_3$ addition to maintain the iron concentration at approximately 200 ppb with the cooling water at a temperature of at least about 230° C. Generally optimum effects are obtained when these conditions of pH, iron concentration and temperature are maintained in the cooling water of the reactor coolant system over a period of at least about 500 hr.

The elevated temperatures of the cooling water can be provided without nuclear fission-produced heat in accordance with a pre-startup treatment by any suitable means or source, such as heat generated by recirculation pumps which drive the cooling water through the reactor coolant system.

In a typical reactor pre-startup treatment in accordance with the invention, suitable amounts of ferric hydroxide in a slightly basic water solution are injected into the reactor coolant for attaining the desired pH of about 8 and iron concentration of about 200 ppb, with the pH being determined at a water temperature of about 25° C. The temperature of the cooling water is maintained at about 230° C. or higher. Given these conditions, the soluble Co-60 in the cooling water can be reduced to less than about 1% of the total Co-60 concentration in the reactor water.

To foster oxidation of the surfaces of the cooling water circuit upon purging of Co-60 from the cooling water, the dissolved oxygen content in the reactor cooling water is maintained at about 200 to about 400 ppb. The oxygen can be provided by introducing oxygenated water, such as control rod drive water, or by injecting oxygen. Preferably the operations of pH adjustment combined with iron solution addition for Co-60 purging of the cooling water system, and oxygen level control are carried out as long as is practical before startup of the nuclear reactor, for example, at least about 500 hr.

Following starting up of the water-cooled nuclear fission reactor, the iron content of the cooling water may be depleted rapidly, whereby a high iron solution injection rate can be appropriate or required to maintain the iron content in the range of about 50 to about 100 ppb. The pH of the water should be maintained in the range of about 7.5 to about 8. Then the nuclear reactor is operated under the given conditions for approximately 500 hr before the iron solution injection is terminated. At this stage the iron content of the cooling water should be maintained at about 5 ppb. This can be achieved by means of feedwater quality control.

I claim:

1. A method for preventing or reducing the formation of material contaminated with Co-60 on the surfaces of a circuit carrying cooling water in a nuclear reactor, comprising the steps of:

adding at least one iron compound to said cooling water in an amount sufficient to maintain an iron concentration in said cooling water in a range from 50 to 200 ppb.

2. The method as defined in claim 1, wherein said iron compound is $Fe(OH)_3$.

3. The method as defined in claim 1, wherein said iron compound is $Fe_2O_3$.

4. The method as defined in claim 1, wherein said iron compound is $Fe_3O_4$.

5. The method as defined in claim 1, wherein said iron compound is ferrous oxalate.

6. The method as defined in claim 1, wherein said iron compound is ferric citrate.

7. The method as defined in claim 1, further comprising the step of maintaining a dissolved oxygen concentration in said cooling water in a range from 200 to 400 ppb.

8. The method as defined in claim 1, further comprising the step of heating said cooling water to a temperature of at least about 230° C. and maintaining said temperature while the iron concentration in said cooling water is in said 50 to 200 ppb range.

9. The method as defined in claim 1, further comprising the step of treating said cooling water to attain a pH thereof in the range of about 7.5 to about 8.0 measured at a cooling water temperature of about 25° C. prior to addition of said iron compound.

10. The method as defined in claim 9, wherein the pH and the iron concentration of said cooling water are maintained within said ranges for a period of at least 500 hours.

11. A method for preventing or reducing the formation of material contaminated with Co-60 on the surfaces of a circuit carrying cooling water in a nuclear reactor, comprising the steps of:

adding at least one iron compound to said cooling water in an amount sufficient to maintain an iron concentration in said cooling water in a range from 50 to 200 ppb during shutdown of said reactor; and adding at least one iron compound to said cooling water in an amount sufficient to maintain an iron concentration in said cooling water in a range from 50 to 100 ppb during operation of said reactor after said shutdown.

12. The method as defined in claim 11, further comprising the step of maintaining a dissolved oxygen concentration in said cooling water in a range from 200 to 400 ppb during said shutdown.

13. The method as defined in claim 11, further comprising the step of heating said cooling water to a temperature of at least about 230° C. and maintaining said temperature while the iron concentration in said cooling water is in said 50 to 200 ppb range during said shutdown.

14. The method as defined in claim 11, further comprising the step of treating said cooling water to attain a pH thereof in the range of about 7.5 to about 8.0 measured at a cooling water temperature of about 25° C. prior to addition of said iron compound during said shutdown.

15. The method as defined in claim 9, wherein the pH and the iron concentration of said cooling water during said shutdown are maintained within said ranges for a period of at least 500 hours.

16. A method for decontaminating the surfaces of a circuit carrying cooling water in a nuclear reactor, said surfaces being contaminated with a material formation containing Co-60 isotope, comprising the steps of:
   shutting down said reactor;
   removing said Co-60 contaminated material formation from said surfaces of said cooling water circuit;
   adding at least one iron compound to said cooling water to provide an iron concentration sufficient to scavenge cobalt from said cooling water; and
   after the cobalt has been scavenged, injecting oxygen into said cooling water to provide a dissolved oxygen concentration sufficient to form an oxide film on said surfaces of said cooling water circuit, said oxide film being substantially free of Co-60 isotope.

17. The method as defined in claim 16, further comprising the step of adding at least one iron compound to said cooling water in an amount sufficient to maintain an iron concentration in said cooling water in a range from 50 to 100 ppb during operation of said reactor after said shutdown.

18. The method as defined in claim 16, further comprising the step of heating said cooling water to a temperature of at least about 230° C. and maintaining said temperature while the iron concentration in said cooling water is 50 to 200 ppb.

19. The method as defined in claim 18, further comprising the step of treating said cooling water to attain a pH thereof in the range of about 7.5 to about 8.0 measured at a cooling water temperature of about 25° C. prior to addition of said iron compound during said shutdown.

20. The method as defined in claim 18, wherein said dissolved oxygen concentration of said cooling water is 200 to 400 ppb.

* * * * *